United States Patent Office 3,523,145
Patented Aug. 4, 1970

3,523,145
HIGH IMPACT COMPOSITIONS BASED ON A POLYPENTENAMER AND POLYSTYRENE
Piero Manaresi, Bologna, and Elvino de Fornasari, Ferrara, Italy, assignors to Montecatini Edison S.p.A., Milan, Italy, a corporation of Italy
No Drawing. Filed Jan. 24, 1968, Ser. No. 700,026
Claims priority, application Italy, Jan. 25, 1967, 11,834/67
Int. Cl. C08f *19/04*
U.S. Cl. 260—886      4 Claims

ABSTRACT OF THE DISCLOSURE

Described are polymeric compositions with particular resistance to impact even at low temperatures. The compositions are based on polystyrene and an unsaturated elastomer. A polypentenamer is used as the elastomer, with the compositions containing between 1 and 30% by weight of said polypentenamer.

---

Our invention relates to polymeric composition of vinyl-aromatic compounds, particularly polymeric compositions of styrene, endowed with high mechanical properties and a high impact resilience even at low temperatures.

It is known that crystalline polymers, particularly polystyrene, show, besides the better known physical characteristics, other characteristics which constitute drawbacks and result directly from their structure. An example of such characteristics is the poor impact resistance which greatly reduces their range of use.

Various processes have been developed in efforts to overcome these drawbacks. Mechanical mixing of polystyrene with an elastomeric material chosen from natural rubber, dienic synthetic elastomers, ethylene-alpha-olefin copolymers, and nonconjugated ethylene-alpha-olefin-diene terpolymers have been tried. Furthermore, graft polymerization of styrene on said elastomeric materials followed, if necessary, by a mechanical mixing of the grafted product with the preshaped polystyrene has been tried.

U.S. patent application Ser. No. 339,455, filed Jan. 22, 1964, now Pat. No. 3,458,489 and corresponding to Italian patent application, provisional filing No. 33,827 filed on Apr. 10, 1963, describes the synthesis of a new elastomeric material, polypentenamer. This material is prepared by polymerization of cyclopentene using as a catalyst system a transition metal compound of groups IV-B and VI-B (preferably chosen from $MoCl_5$, $MoF_5Cl$, $WCl_6$ etc.) and an organometallic compound or a metalhydride of the groups 1-A, II and III (preferably chosen from $Al(C_2H_5)_2Cl$, $Al(C_2H_5)_3$, $Al(C_6H_{13})_3$, $Al(iso\ bu)_3$ etc.).

This elastomer shows a very limited distribution of the molecular weights and a low temperature glass transition and on the whole possesses good elastomeric characteristics which are often better than those of most commercial synthetic elastomers.

We have found that coupling of the elastic qualities of polypentenamer with the known physical-mechanical characteristics of polystyrene results in polymeric compositions having a particularly good impact resistance even at low temperatures. Thus an object of our invention are polymeric compositions, resistant to impact even at low temperatures, based on vinylaromatic polymers and on an unsaturated elastomer. The elastomer is a polypentenamer and is present in from 1 to 30, and preferably from 5 to 20 parts or percent by weight of the mixture.

The compositions of our invention may be suitably prepared for example by mechanical mixing of polystyrene with suitable quantities of polypentenamer and, if desired, plasticizers, antioxidant fillers, etc. They may also be prepared by dissolution of the elastomer in styrene monomer and subsequent graft polymerization at temperatures ranging from 50 to 210° C. in the presence of free radical initiators chosen from organic peroxides and/or azo-compounds, of chain transfer agents such as organic disulfides, for example bis-(isopropylxanthogen)disulfide, dibenzyl-disulfide, bis(chlorobenzyl)disulfide, bis(beta-hydroethyl-disulfide), di-2-benzothiazyl disulfide, or mercaptanes, such as for example dodecylmercaptane etc., together with possible plasticizers, antioxidants and other additives.

According to our invention, a polypentenamer having a Mooney viscosity ranging between 20 and 80, preferably between 25 and 50, corresponding to values of the intrinsic viscosity ranging between 1.5 and 3.5 dl./g., is preferably used. When the composition is prepared by gramt polymerization, it is possible to determine the quantity of grafted polystyrene from the quantity of polystyrene which cannot be extracted with methylethylketone. This ranges between ½ and 2 times the weight of the polypentenamer employed.

The following examples are given in order to better illustrate the present invention, and not to limit the same.

EXAMPLE 1

In 2325 g. of styrene (93%) were dissolved 150 g. (6% on the total) of polypentenamer having a very restricted distribution of the molecular weights (in fact about 90% of the polymer ranges between $[\eta]=1.8$ and $[\eta]=3$), and having the following characteristics:

$$[\eta]_{toluene}^{30°\ C} = 1.84$$
$$ML(1+4)100°\ C. = 30$$
$$cis = 15\%$$
$$trans = 85\%$$

together with 33 g. of paraffinic oil (0.5%), 33 g. of 2-ethylhexylphthalate (0.5%), 0.25 g. of cumyl peroxide (0.01%) and 1.25 g. of bis(isopropylxanthogen)disulfide (0.05%). This mixture, placed into a glass reactor suitably provided with a stirrer, was heated under nitrogen atmosphere for 20 hours at 85° C., and then for 8 hours at 110° C. up to a conversion of approximately 50%. Afterwards the stirring was interrupted and the heating was continued for 8 hours at 140° C., for 24 hours at 160° C. and finally for 12 hours at 180° C., when the polymerization was considered finished.

EXAMPLE 2

A composition was prepared under the same conditions of Example 1, but using 2275 g. of styrene (91%), 200 g. of polypentenamer (8% on the total) having the same characteristics as in Example 1 and the same quantities of each of the other ingredients in said example.

EXAMPLE 3

A third composition was prepared under the same conditions of the preceding examples, but using 2300 g. of styrene (92%), 175 g. of polybutadienic rubber (7% on the total) having the following characteristics:

$$cis\ 1,4 = 20\%$$
$$trans\ 1,4 = 55\%$$
$$1,2-(vinyl) = 25\%$$
$$ML\ (1+4)\ 100°\ C. = 40.5$$
$$[\eta]_{toluene}^{30°\ C.} = 2.30$$

and the same quantities of the other ingredients used in Examples 1 and 2.

The distribution of the molecular weights of this elastomer was very wide with only about 60% between $[\eta]=1$ and $[\eta]=3$.

The characteristics of our compositions were compared to those of a composition based on polybutadiene (Example 3) in the following Table I.

TABLE I

| Characteristics | Examples | | |
|---|---|---|---|
| | 1 | 2 | 3 |
| Solubility in methyl alcohol, percent by weight | 5 | 4.2 | 5.6 |
| Insolubility in methylethylketone, percent | 13.3 | 18.1 | 16.6 |
| Melt index (190° C.—10 kg.), g./10′ | 15 | 17 | 9.9 |
| Vicat, ° C. | 88 | 84 | 84 |
| Heat distortion temp., ° C. | 75 | 73 | 72 |
| Impact strength Izod unnotched, kg. cm./cm.²: | | | |
| 23° C. | 63 | 76 | 80 |
| −20° C. | 64 | 71 | 69 |
| −40° C. | 48 | 55 | 50 |
| Impact strength Izod notched, kg. cm./cm.: | | | |
| 23° C. | 11.1 | 11.1 | 12.3 |
| −20° C. | 6.2 | 7 | 5.9 |
| −40° C. | 5.7 | 6.4 | 5.5 |

EXAMPLE 4

A composition was prepared under the same conditions described in Example 1, but using 2300 g. of styrene (92%) and 175 g. of polypentenamer (7% on the total) having the same characteristics as that of Example 1, and the same quantities of the other ingredients indicated in said example.

The other conditions remained unchanged, while the stirring of the mixture was stopped when the conversion reached about the 20% level.

EXAMPLE 5

This example was prepared under the same conditions as Example 4 but omitting the molecular weight regulator bis(isopropylxanthogen)disulfide.

The characteristics of the polymers of Examples 4 and 5, compared in Table II, clearly show the influence of the absence of the molecular weight regulator (Example 5) on the final properties of high resilience polystyrene.

TABLE II

| Characteristics | Examples | |
|---|---|---|
| | 4 | 5 |
| Solubility in methyl alcohol, percent by weight | 3.6 | 2.5 |
| Insolubility in methylethyl detone, percent by weight | 17.6 | 11.5 |
| Melt index (190° C.—10 kg.), g./10′ | 13.4 | 4.7 |
| Vicat, ° C. | 85 | 91 |
| Heat distortion temp., ° C. | 73 | 77 |
| Impact strength Izod unnotched, kg. cm./cm.²: | | |
| 23° C. | 78 | 50 |
| −20° C. | 74 | 26 |
| −40° C. | 68 | 16 |
| Impact srength Izod notched, kg. cm./cm.: | | |
| 23° C. | 10.9 | 5.5 |
| −20° C. | 6.8 | 4.2 |
| −40° C. | 5.9 | 3.2 |

EXAMPLE 6

A composition is prepared under the same conditions as those of Example 1, but employing 150 g. (6% on the total amount of polymer) of a polypentenamer having the following characteristics:

$$[\eta]^{30°\ (in\ toluene)} = 2.4$$

$$(ML(1+4)100°\ C. = 26\ cis \geqslant 99\%$$

The mixture is polymerized with the same amounts of additives and catalysts and under the same conditions as those given in Example 1. The characteristics of the polymer are given in Table III.

TABLE III

| Characteristics: | Example 6 |
|---|---|
| Solubility in CH₃OH, percent by weight | 2.8 |
| Insolubility in methyl-ethyl-ketone, percent by weight | 14.5 |
| Vicat, ° C. | 85 |
| Heat distortion temperature, ° C. | 78 |
| Impact strength Izod without notch, kg. cm./cm.²: | |
| 23° C. | 73 |
| 20° C. | 69 |
| Impact strength Izod with notch, kg. cm./cm.: | |
| 23° C. | 12 |
| −20° C. | 6.8 |

We claim:

1. A polymeric composition having increased resistance to impact even at low temperatures comprising a graft copolymer of styrene monomer grafted onto a polypentenamer having a Mooney viscosity between 20 and 80 and being prepared by polymerization of cyclopentene, said graft copolymer having a styrene content between ½ and 2 times the weight of the polypentenamer and being dispersed in a styrene homopolymer matrix.

2. Compositions according to claim 1, containing between 5 and 20% by weight of polypentenamer.

3. Compositions according to claim 2, containing besides polystyrene and polypentenamer, at least one plasticizer and antioxidant.

4. Compositions of claim 1, wherein the polypentenamer has a Mooney viscosity ranging between 25 and 50.

References Cited

FOREIGN PATENTS 594,667    3/1960    Canada.

SAMUEL H. BLECH, Primary Examiner

C. J. SECCURO, Assistant Examiner

U.S. Cl. X.R.

260—874, 876, 878, 880, 93.1, 33.6, 31.8